US010880043B2

(12) United States Patent
Bauer et al.

(10) Patent No.: US 10,880,043 B2
(45) Date of Patent: Dec. 29, 2020

(54) METHOD AND COMPUTER SYSTEM FOR ESTABLISHING AN INTERACTIVE CONSISTENCY PROPERTY

(71) Applicant: TTTech Computertechnik Aktiengesellschaft, Vienna (AT)

(72) Inventors: Günther Bauer, Vienna (AT); Wilfried Steiner, Vienna (AT); Christian Fidi, Dietmanns (AT)

(73) Assignee: TTTech Computertechnik AG, Vienna (AT)

( * ) Notice: Subject to any disclaimer, the term of this patent is extended or adjusted under 35 U.S.C. 154(b) by 113 days.

(21) Appl. No.: 15/953,919

(22) Filed: Apr. 16, 2018

(65) Prior Publication Data
US 2018/0309541 A1    Oct. 25, 2018

(30) Foreign Application Priority Data

Apr. 25, 2017 (EP) .................................. 17167902

(51) Int. Cl.
*H04L 1/08* (2006.01)
*G06F 1/14* (2006.01)
(Continued)

(52) U.S. Cl.
CPC ................ *H04L 1/08* (2013.01); *H04L 12/44* (2013.01); *H04L 41/0654* (2013.01); *G06F 1/14* (2013.01);
(Continued)

(58) Field of Classification Search
CPC ... H04L 1/00; H04L 1/08; H04L 1/189; H04L 12/00; H04L 12/02; H04L 12/28;
(Continued)

(56) References Cited

U.S. PATENT DOCUMENTS 9,787,494 B2 * 10/2017 Steiner .............. H04L 12/40182
2005/0117596 A1 6/2005 Kopetz
(Continued)

FOREIGN PATENT DOCUMENTS

EP    2209241 A2    7/2010
EP    3166246 A1    5/2017

OTHER PUBLICATIONS

A book on Real Time Systems, Design principles for distributed Embedded Applications by Hermann Kopetz, (Year: 1997).*
(Continued)

*Primary Examiner* — Nishant Divecha
(74) *Attorney, Agent, or Firm* — Eversheds Sutherland (US) LLP

(57) ABSTRACT

Methods and computer systems for establishing an interactive consistency property between receivers of messages. Messages are transmitted to receivers by a sender over a communication network including disjoint communication paths for connecting receivers and sender. Switches include local clocks. Local clocks of non-faulty switches are synchronized to each other with a maximum error (precision), and receivers detect switch failures. Redundant copies of a message are forwarded by sender to each receiver across different disjoint communication paths. A switch of each disjoint path is configured such that redundant copies are forwarded to each receiver with a temporal distance between disjoint paths. That distance is selected such that all non-faulty receivers receive redundant copies in the same receive order, when the switches and communication links of the disjoint paths exhibit no failure. Each receiver concludes from the receive order whether and which redundant copy to accept to satisfy the interactive consistency property.

16 Claims, 5 Drawing Sheets

Figure 1:
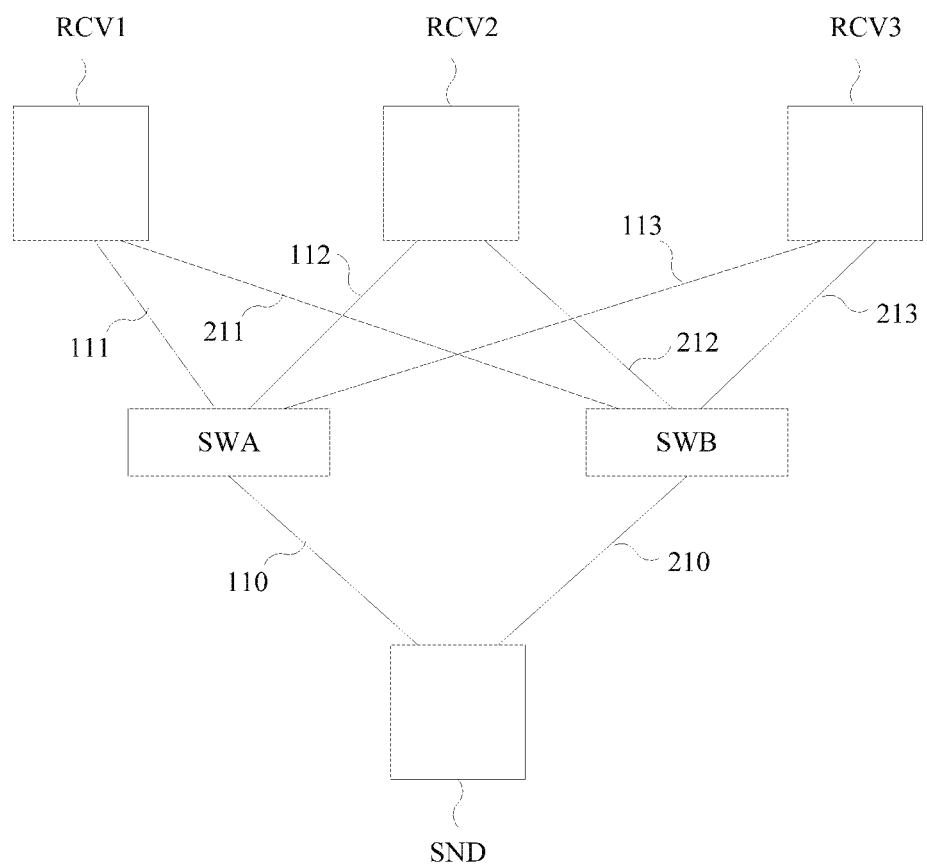

(51) Int. Cl.
  *H04L 12/24* (2006.01)
  *H04L 12/44* (2006.01)
  *G06F 11/14* (2006.01)
  *G06F 11/16* (2006.01)
  *H04J 3/06* (2006.01)
(52) U.S. Cl.
  CPC ...... *G06F 11/1443* (2013.01); *G06F 11/1625* (2013.01); *H04J 3/0667* (2013.01)
(58) Field of Classification Search
  CPC ......... H04L 12/54; H04L 51/04; H04L 65/00; H04L 49/25; H04L 49/557; H04L 9/32; H04L 41/06; H04J 3/06; H04H 20/02; H04H 40/09
  See application file for complete search history.

(56) References Cited

U.S. PATENT DOCUMENTS

| | | | |
|---|---|---|---|
| 2014/0036735 A1* | 2/2014 | Hall | ..................... H04L 45/128 370/276 |
| 2014/0185632 A1 | 7/2014 | Steiner et al. | |
| 2016/0211987 A1 | 7/2016 | Fidi | |

OTHER PUBLICATIONS

European Search Report issued in Application No. 17167902.0, completed Nov. 6, 2017 (1 page).
Lamport, et al., "The Byzantine Generals Problem", ACM Transactions on Programming Languages and Systems (TOPLAS), vol. 4, No. 3, Jul. 1982, pp. 382-401.

\* cited by examiner

METHOD AND COMPUTER SYSTEM FOR ESTABLISHING AN INTERACTIVE CONSISTENCY PROPERTY

The invention relates to a method for establishing an interactive consistency property between receivers of messages in a computer system, in particular a distributed computer system, wherein said messages are transmitted to said receivers by a sender of said computer system over a communication network connecting the receivers and the sender, wherein said communication network comprises communication paths for connecting the receivers to the sender, wherein each of the receivers is connected to the sender with at least two disjoint communication paths, wherein each of said disjoint communication paths comprises at least one switch and communication links, wherein a communication link is connecting a receiver to a switch of a disjoint communication path and a communication link is connecting the sender to a switch of said disjoint communication path.

Furthermore, the invention relates to a computer system, in particular distributed computer system, comprising at least one sender and receivers, wherein for the exchange of messages a sender is connected to the receivers over a communication network, wherein said communication network comprises communication paths for connecting the receivers to the sender, and wherein for establishing an interactive consistency property between the receivers of messages each of the receivers is connected to the sender with at least two disjoint communication paths, wherein each of said disjoint communication paths comprises at least one switch and communication links, wherein a communication link is connecting a receiver to a switch of a disjoint communication path and a communication link is connecting the sender to a switch of said disjoint communication path.

The invention is in the area of computer systems, in particular in the area of fault-tolerant computing systems. The invention describes a novel method to reduce the number of messages to be exchanged for interactive consistency between a set of non-faulty nodes.

In a computer system with a fault-tolerant architecture, wherein said computer system comprises a set of nodes (which for example act as senders and/or receivers of messages) that are interconnected to each other by means of a communication network, interactive consistency ensures that all non-faulty nodes of said set of nodes consistently agree on actions to be taken by the nodes.

Interactive consistency has originally been defined in [1] by two conditions using an analogy known as the Byzantine Generals Problem:

IC1. All loyal lieutenants obey the same order.
IC2. If the commanding general is loyal, then every loyal lieutenant obeys the order he sends.

This original definition translates to a networked computer system as follows:

IC1: All non-faulty nodes accept the same message from a given sender.
IC2: If the sending node is non-faulty, then every non-faulty receiver accepts the message from the sender.

Typically achieving these interactive consistency conditions (IC1, IC2) requires the nodes to implement interactive consistency algorithms. According to such algorithms the receiving nodes exchange—with messages (so-called "information messages")—between themselves which messages they received from the sending node. Because of this exchange, interactive consistency algorithms are expensive in the number of messages to be communicated between the nodes.

It is an object of the invention to provide a novel form of synchronized interactive consistency.

This object is achieved with a method and a computer system described in the introduction, wherein
(a) the switches are equipped with local clocks, wherein local clocks of non-faulty switches of said switches are synchronized to each other with a maximum error (precision), and wherein
(b) the receivers are configured to detect failures of switches, and wherein
(c) redundant copies of a message are forwarded by the sender to each of the receivers, wherein each of the redundant copies designated for a receiver is forwarded across a different disjoint communication path connecting the sender with said receiver, and wherein
(d) at least one switch of each disjoint communication path from the sender to the receivers is configured such that the redundant copies of the message are forwarded to each receiver with a temporal distance, CON, between the disjoint communication paths, wherein the temporal distance, CON, is selected such that all non-faulty receivers of the receivers will receive the redundant copies in the same receive order, when the switches and communication links of the disjoint paths do not exhibit a failure, and wherein
(e) each receiver concludes at least from the receive order of the redundant copies of the message whether and which redundant copy to accept to satisfy the interactive consistency property, and if the conclusion yields to accept a specific copy of the received redundant copies of the message, said specific message is accepted by the receiver, and if the conclusion yields to not accept any copy of the receive redundant messages, no copy is accepted by the receiver.

Synchronized consistency according to the invention configures the communication network between the nodes in a way, that redundant copies of a message sent by a sending node ("sender") over multiple disjoint paths through the communication network are delivered to the receiving nodes ("receivers") by the communication network with a sufficiently high temporal offset that guarantees that all non-faulty nodes will receive the messages in the same order. Since either a node (sender or receiver) or the communication network itself may exhibit a failure at any point of time and the elements of the communication network are designed to fail in benign failure modes, then nodes can execute the method disclosed in this invention to establish interactive consistency without a need for communicating the additional information messages between themselves.

Different paths between a specific sender and a specific receiver are called "disjoint", if these paths do not have any switches or communication links in common. In other words, switches and communication links of a specific disjoint path connecting a receiver and a sender cannot be elements of any other disjoint path connecting the same sender and receiver.

The term "redundant copies of a message" means that a sender sends two or more messages which contain at least in parts the same information in the payload. The receivers know before reception of the messages (e.g., by configuration) which parts of the payload of said messages are intended to hold the same information. The two or more messages representing said redundant copies may vary, for example in their Path-ID, their Message-ID, additional information in the payload other than said parts of the same information (e.g., additional application data), message check-sums, message encoding, cryptographic signatures.

Advantageous embodiments of the method and the computer system described above are detailed hereinafter:

In (e), in addition, the validity of the received redundant copies of the message may be taken into account for concluding whether and which redundant copy to accept to satisfy the interactive consistency property.

In or according to (e) it may be provided that:
(i) all non-faulty receivers which receive two or more redundant copies of the message are configured to accept the first one valid copy of the redundant copies that they receive;
(ii) all non-faulty receivers which receive only one valid copy of the redundant copies of the message are configured to accept this one copy;
(iii) all non-faulty receivers which do not receive any redundant copy of the redundant copies of the message do not accept a message.

In or according to (e) it may be provided that:
(i) all non-faulty receivers which receive two or more redundant copies of the message are configured to accept the last one valid copy of the redundant copies that they receive;
(ii) all non-faulty receivers which receive only one valid copy of the redundant copies of the message are configured to accept this one copy;
(iii) all non-faulty receivers which do not receive any redundant copy of the redundant copies of the message do not accept a message.

In item (i) a receiver may discard the respective other redundant copy or copies of the received redundant copies of the message.

The sender and all receivers may be equipped with local clocks, wherein the local clocks of a non-faulty sender and non-faulty receivers are synchronized to the local clocks of the switches with a known error (precision), and the sender sends the redundant copies of a message according to a communication schedule and the receivers know when to expect a message according to said communication schedule.

The local clocks of the switches and/or the local clocks of the sender and/or the local clocks of the receivers may be synchronized by means of the IEEE 1588, and/or the IEEE 802.1AS, and/or the SAE AS6802 protocol.

One, more or preferably all communication links may be Ethernet links. Links may be wired or wireless.

The temporal distance (duration), CON, may be a function of the precision of the communication network, wherein CON>FACTOR*precision, where FACTOR is a natural number greater than 0.

Figure 2:
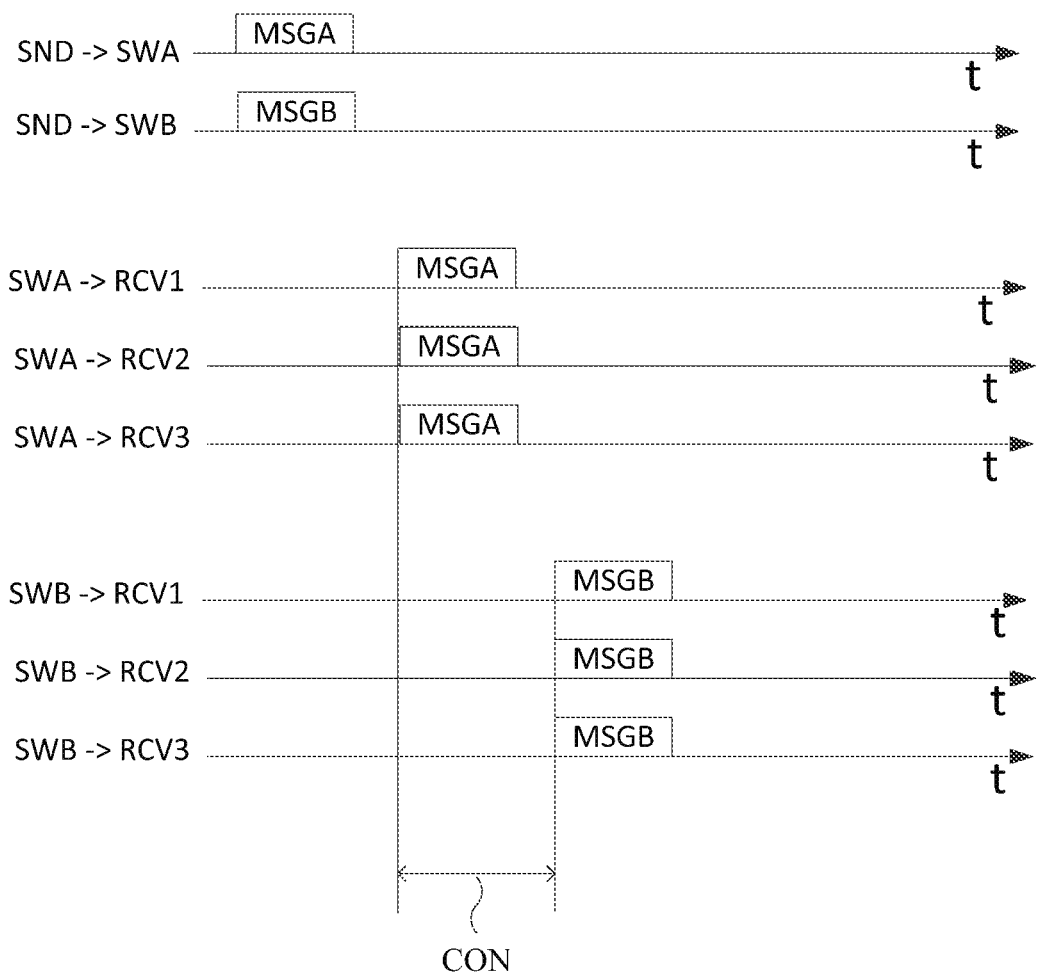
Figure 3:
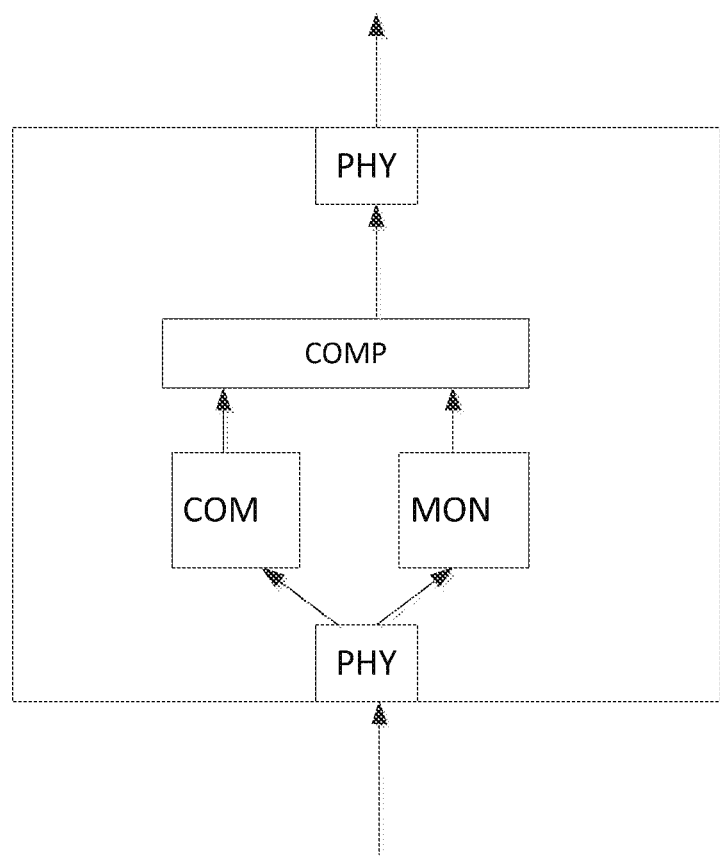
Figure 4:
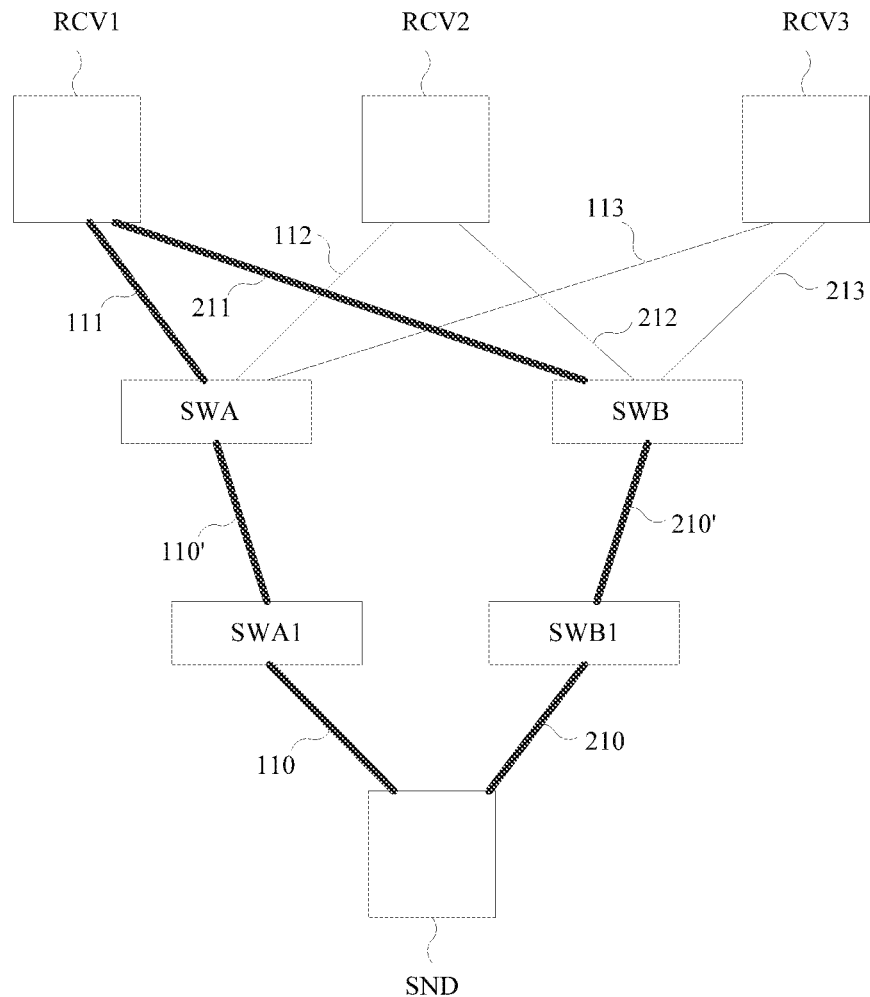
Figure 5:
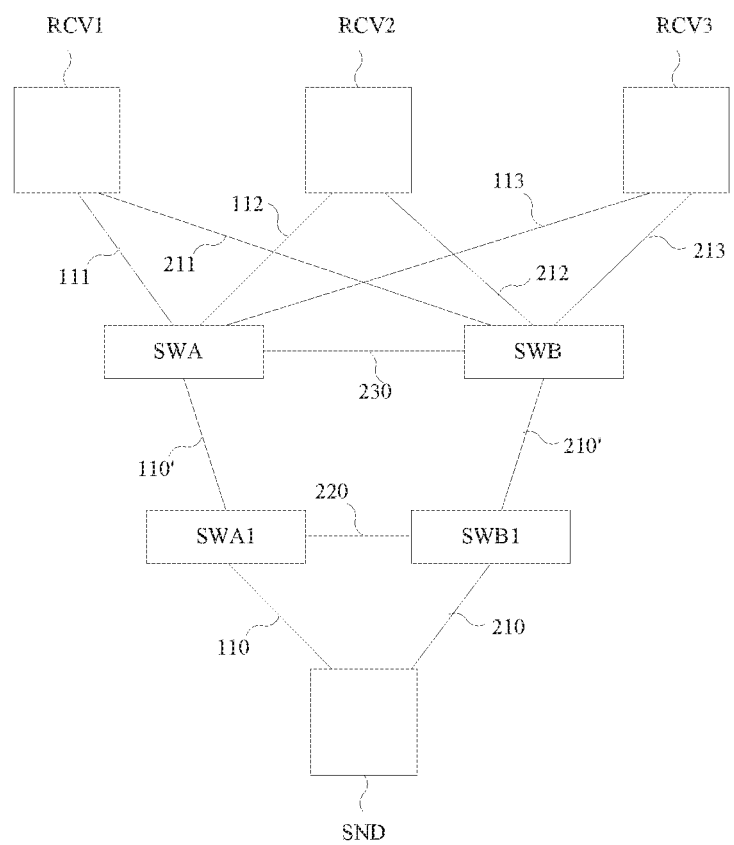

In the following, in order to further demonstrate the present invention, illustrative and non-restrictive embodiments are discussed, as shown in the drawings, which show:

FIG. 1 distributed computer system,
FIG. 2 communication configuration,
FIG. 3 an example of a self-checking pair design of a switch,
FIG. 4 distributed computer system, with multiple switches per disjoint communication path, and
FIG. 5 distributed computer system with a ring topology.

We discuss some of the many implementations of the invention next.

FIG. 1 depicts a distributed computer system consisting of four nodes SND, RCV1, RCV2, RCV3 connected to each other by means of a communication network, wherein the communication network in this example consists of two switches SWA, SWB and communication links 110, 210; 111, 112, 113, 211, 212, 213 between the nodes (sender SND, receivers RCV1, RCV2, RCV3) and the switches. The communication links 110, 210; 111, 112, 113, 211, 212, 213 may be either full-duplex or half-duplex. Furthermore, each communication link 110, 210; 111, 112, 113, 211, 212, 213 may comprise a multitude of physical links. For simplicity of discussion we assume, without loss of generality, that the communication links 110, 210; 111, 112, 113, 211, 212, 213 are full-duplex Ethernet links and the switches SWA, SWB are Ethernet switches. Node SND sends messages to other nodes RCV1, RCV2, RCV3. Nodes RCV1, RCV2, RCV3 may be faulty or may operate correctly (i.e., are non-faulty). All non-faulty nodes of the nodes RCV1, RCV2, RCV3 need to agree on whether and what messages they have received from the node SND. For this, and according to the state-of-the-art, at least the non-faulty nodes of RCV1, RCV2, RCV3 would exchange information about messages received from node SND by exchanging additional messages (so-called "information-messages") between each other using the communication network.

The invention described in this application avoids said exchange of information-messages between the nodes RCV1, RCV2, RCV3 by means of specific functionality of the communication network. We will describe this specific configuration next. It should be noted that this functionality is explained using the example with two switches, however, the following description is valid within the full scope of the invention and not limited to a communication network comprising two switches only.

According to this specific functionality of the communication network the switches SWA, SWB in the network are equipped with local clocks and said local clocks are synchronized to each other with a maximum synchronization error called the precision.

Furthermore, in the case of a failure of a switch SWA, SWB, the failure of said switch is detectable for a node RCV1, RCV2, RCV3. This can be achieved by constructing the switch as a self-checking pair as depicted in FIG. 3, which we will discuss later in this text. Other example realizations are disclosed in [2] and [3].

The sender SND will send its message as redundant copies to the switches SWA, SWB, which switches SWA, SWB are configured such that they will forward the redundant messages sent by the sender SND with a sufficiently long duration in between the points in time of the respective forwarding of the messages (see interval CON in FIG. 2), such that all receivers RCV1, RCV2, RCV3, exhibit the same receive order of the redundant messages in case that they receive both messages. We discuss this communication configuration in more detail based on FIG. 2.

FIG. 2 depicts a communication configuration as described under item 3 above. According to this communication configuration sender SND sends redundant copies of a message, MSGA, MSGB over disjoint paths through the communication network to the receivers RCV1, RCV2, RCV3, which are shown in FIG. 1. In the case of two disjoint communication paths between a sender and a receiver two redundant copies are transmitted, one copy per disjoint path. In case of three or more disjoint paths between a sender and receiver, two, three or a number of copies corresponding to the number of disjoint paths are transmitted from the sender to the receiver. Each of the copies is transmitted on a different disjoint paths.

As shown in FIG. 2, a first disjoint path from the sender to a receiver RCV1 consists of switch SWA and the communication link 110 from the sender SND to the switch SWA and the communication link 111 from the switch SWA to said receiver RCV1 connected to it, the second disjoint path consists of switch SWB and the communication links 210 from the sender SND to the switch SWB and the communication link 211 from the switch SWB to said receiver RCV1. Sender SND and receiver RCV2 are connected by the two disjoint paths [communication link 110—switch SWA—communication link 112] and [communication link 210—switch SWB—communication link 212]. Sender SND and receiver RCV3 are connected by the two disjoint paths [communication link 110—switch SWA—communication link 113] and [communication link 210—switch SWB—communication link 213].

Returning to FIG. 2, the sender SND sends the redundant copies MSGA, MSGB at the same point in time. In another realization, sender SND may send the copies MSGA, MSGB at different points in time. As depicted in FIG. 2 switch SWA forwards messages MSGA to the receivers RCV1, RCV2, RCV3, first followed by switch SWB forwarding MSGB to the receivers RCV1, RCV2, RCV3. As depicted, there is a minimum time interval CON in between the forwarding points in time of the switches SWA, SWB of the messages MSGA, MSGB. This time interval CON is configured to be sufficiently long, such that all non-faulty receivers RCV1, RCV2, RCV3 will receive the messages MSGA and MSGB in the same order in case they receive both messages.

The duration (length) of the time interval CON can be chosen, for example, as a function of the precision of the system, e.g., duration>precision or duration>FACTOR*precision, where FACTOR is a natural number greater than 0.

Another example of calculating CON would be a function taking the worst-case transmission delays wc_delay of the messages into account: Then, duration>wc_delay or duration>FACTOR1*wc_delay, where FACTOR1 is a natural number greater than 0.

Another example of calculating CON would be a function taking the worst-case transmission delays wc_delay as well as the precision into account. Then, duration>wc_delay+precision or duration>FACTOR2*wc_delay+FACTOR3*precision. Where FACTOR, FACTOR1, FACTOR2, FACTOR3 are natural numbers greater than 0.

An algorithm as described in the following is executed in the receivers RCV1, RCV2, RCV3 of the computer system shown in FIG. 1 and ensures that when a non-faulty receiver RCV1, RCV2, RCV3 accepts a message all other non-faulty receivers RCV1, RCV2, RCV3 accept either the same message or an identical copy. Furthermore, if a non-faulty receiver RCV1, RCV2, RCV3 does not accept any redundant copy of the message from SND, then all other non-faulty receivers RCV1, RCV2, RCV3 also do not accept any of the redundant messages from the sender SDN. According to this algorithm being executed in the receivers (i) a receiver RCV1, RCV2, RCV3 that receives both redundant copies will accept the first valid message of the redundant copies MSGA, MSGB that it receives and will discard the respective other redundant copy of MSGA, MSGB;

(ii) a receiver RCV1, RCV2, RCV3 that receives only one copy MSGA or MSGB (for example because of a failure of a switch) will accept this one copy;

(iii) a receiver RCV1, RCV2, RCV3 that does not receive any redundant copy MSGA, MSGB does not accept a message.

Alternatively to the item (i)—items (ii) and (iii) remain unchanged—it may be provided that all receivers may execute the following step:

(ia) A receiver RCV1, RCV2, RCV3 that receives both redundant copies will accept the first valid message of the redundant copies MSGA, MSGB and will discard the respective other redundant copy of MSGA, MSGB only if the redundant copies MSGA, MSGB match with respect to their message contents (for example if they contain the same application data) and discard both messages MSGA, MSGB otherwise.

In yet another embodiment items (ii) and (iii) remain unchanged, but according to item (i) or item (ia) it is not the first, but the last valid copy of the redundant copies which is accepted by a receiver. The other features of item (i) or item (ia) remain unchanged.

Examples of validity criteria of a message are: valid checksum of the message, valid timestamp, valid sequence number, cryptographic signature, etc.

FIG. 3 depicts an example of a self-checking pair switch design. In this design the switch shown in FIG. 3 receives a message on the bottom port PHY and processes the message in two fault-containment units COM, MON. The output of the two fault-containment units COM, MON is compared by another fault-containment unit COMP and only if the output of the two fault-containment units COM, MON is consistent the third fault-containment unit COMP unit will forward the message to the output, in this case the port PHY on the top of the switch. Such a self-checking pair structure allows to assume with reasonable high probability that the switch itself will not be able to generate arbitrary new messages, nor that the switch can delay received message for an arbitrary duration.

FIG. 4 depicts a distributed computer system in which each disjoint path comprises more than one switch, i.e., switches SWA1, SWA for a first disjoint path and switches SWB1, SWB for a second disjoint path. The reference signs correspond to that used in FIG. 1, in addition switch SWA1 is connected to switch SWA with a communication link 110' and switch SWB1 is connected to switch SWB with a communication link 210'. In such a setting at least one of the switches per disjoint path (an example of two disjoint paths between sender SND and receiver RCV1 is shown on bold lines) would be configured such that a time interval CON as described above in forwarding of the redundant copies of messages from a sender SND is established.

FIG. 5 depicts a distributed computer system in which each disjoint path comprises more than one switch, i.e., switches SWA1, SWA for a first disjoint path and switches SWB1, SWB for a second disjoint path. Again, the reference signs correspond to that used in FIG. 1, in addition switch SWA1 is connected to switch SWA with a communication link 110' and switch SWB1 is connected to switch SWB with a communication link 210'. In such a setting at least one of the switches per disjoint path is configured such that a time interval CON as described above in forwarding of the redundant copies of messages from a sender SND is established. In addition the switches SWA1, SWA, SWB1, SWB are connected to form a ring topology with communication links 220, 230. The ring topology—especially in the case that more switches than shown (for example more than 5, or more than 6 switches) are provided to form a ring—are allows reconfiguring the disjoint paths between the receivers RCV1, RCV2, RCV3 and the sender SND in case of link failures or switch failures and thereby improves the reliability of the overall system.

Physical topologies other than the redundant switch, redundant tree, and ring topologies are possible as well as long as the physical topology provides sufficient redundancy to enable two disjoint paths between any two nodes in the system.

REFERENCES

[1] Lamport, Leslie, Robert Shostak, and Marshall Pease. "The Byzantine generals problem." *ACM Transactions on Programming Languages and Systems (TOPLAS)* 4, no. 3 (1982): 382-401.
[2] Method for transmitting messages in a computer network, and computer network, WO2015058224A1
[3] EP 3 166 246 A1

The invention claimed is:

1. A method for establishing an interactive consistency property between receivers (RCV1, RCV2, RCV3) of messages (MSGA, MSGB) in a distributed computer system, wherein said messages (MSGA, MSGB) are transmitted to said receivers (RCV1, RCV2, RCV3) by a sender (SND) of said distributed computer system over a communication network connecting the receivers (RCV1, RCV2, RCV3) and the sender (SND), wherein said communication network comprises communication paths for connecting the receivers (RCV1, RCV2, RCV3) to the sender (SND), wherein each of the receivers (RCV1, RCV2, RCV3) is connected to the sender (SND) with at least two disjoint communication paths of the communication paths, wherein each of said disjoint communication paths comprises a switch (SWA, SWB; SWA1, SWA2, SWB1, SWB2) and communication links (110, 210; 111, 112, 113, 211, 212, 213), and wherein a first communication link (111, 112, 113, 211, 212, 213) is configured to connect one of the receivers to the switch (SWA, SWB; SWA1, SWB1) of one of the at least two disjoint communication paths and a second communication link (110, 210) is configured to connect the sender (SND) to the switch of said one disjoint communication path, the method comprising:
(a) equipping the switches (SWA, SWA1, SWB, SWB1) with local clocks, wherein local clocks of non-faulty switches of said switches (SWA, SWB, SWA1, SWB1) are synchronized to each other with a maximum error precision;
(b) configuring the receivers (RCV1, RCV2, RCV3) to detect failures of switches (SWA, SWA1, SWB, SWB1);
(c) forwarding redundant copies (MSGA, MSGB) of a message of the messages by the sender (SND) to each of the receivers (RCV1, RCV2, RCV3), wherein each of the redundant copies (MSGA, MSGB) designated for a receiver of the receivers (RCV1, RCV2, RCV3) is forwarded across a different one of the at least two disjoint communication paths connecting the sender (SND) with said receiver (RCV1, RCV2, RCV3);
(d) configuring the switch of each one of the at least two disjoint communication paths from the sender (SND) to the receivers (RCV1, RCV2, RCV3) to forward the redundant copies (MSGA, MSGB) of the message to the receivers (RCV1, RCV2, RCV3) with a temporal distance (CON) between the disjoint communication paths, wherein the temporal distance (CON) is selected such that all non-faulty receivers of the receivers (RCV1, RCV2, RCV3) are configured to receive the redundant copies (MSGA, MSGB) in the same receive order when the switches and communication links of the at least two disjoint communication paths do not exhibit a failure; and
(e) determining by each receiver of the receivers (RCV1, RCV2, RCV3), at least from the receive order of the redundant copies (MSGA, MSGB) of the message, whether and which redundant copy (MSGA, MSGB) to accept to satisfy the interactive consistency property, and if a specific copy (MSGA, MSGB) of the received redundant copies of the message is accepted, then said specific copy is accepted by the receiver, and if any copy of the receive redundant messages is not accepted, then no copy is accepted by the receiver (RCV1, RCV2, RCV3),
wherein the interactive consistency property comprises (i) all non-faulty receivers being configured to accept the messages from the sender, and (ii) if the sender is non-faulty, every non-faulty receiver being configured to accept the messages from the sender, and
wherein the temporal distance, CON, is a function of a precision of the communication network, wherein CON>FACTOR*precision, where FACTOR is a natural number greater than 0.

2. The method of claim 1, wherein in step (e), a validity of the received redundant copies (MSGA, MSGB) of the message is taken into account for determining whether and which redundant copy (MSGA, MSGB) to accept to satisfy the interactive consistency property.

3. The method of claim 2, wherein in step (e):
(i) all non-faulty receivers (RCV1, RCV2, RCV3) which receive two or more redundant copies (MSGA, MSGB) of the message are configured to accept a first valid copy of the redundant copies (MSGA, MSGB) that they receive;
(ii) all non-faulty receivers (RCV1, RCV2, RCV3) which receive only one valid copy (MSGA, MSGB) of the redundant copies (MSGA, MSGB) of the message are configured to accept the one valid copy; and
(iii) all non-faulty receivers (RCV1, RCV2, RCV3) which do not receive any redundant copy (MSGA, MSGB) of the redundant copies of the message do not accept the message.

4. The method of claim 3, wherein in step (i) the receiver discards the respective other redundant copy or copies of the received redundant copies (MSGA, MSGB) of the message.

5. The method of claim 1, wherein in step (e):
(i) all non-faulty receivers (RCV1, RCV2, RCV3) which receive two or more redundant copies (MSGA, MSGB) of the message are configured to accept a last valid copy of the redundant copies (MSGA, MSGB) that they receive;
(ii) all non-faulty receivers (RCV1, RCV2, RCV3) which receive only one valid copy (MSGA, MSGB) of the redundant copies (MSGA, MSGB) of the message are configured to accept the one valid copy; and
(iii) all non-faulty receivers (RCV1, RCV2, RCV3) which do not receive any redundant copy (MSGA, MSGB) of the redundant copies of the message do not accept the message.

6. The method of claim 1, wherein the sender (SND) and all receivers (RCV1, RCV2, RCV3) are equipped with local clocks, wherein the local clocks of a non-faulty sender and non-faulty receivers are synchronized to the local clocks of the switches with a known precision, and wherein the sender (SND) sends the redundant copies (MSGA, MSGB) of the message according to a communication schedule and the receivers know when to expect the message according to said communication schedule.

7. The method of claim 6, wherein the local clocks of the switches, the local clocks of the sender (SND), and/or the local clocks of the receivers (RCV1, RCV2, RCV3) are synchronized by the IEEE 1588, the IEEE 802.1AS, and/or the SAE AS6802 protocol.

8. The method of claim 1, wherein at least one of the communication links (110) are Ethernet links.

9. A distributed computer system, comprising:
a sender (SND); and
receivers (RCV1, RCV2, RCV3), wherein for an exchange of messages, the sender (SND) is connected to the receivers (RCV1, RCV2, RCV3) over a communication network,
wherein said communication network comprises communication paths for connecting the receivers (RCV1, RCV2, RCV3) to the sender (SND), wherein for establishing an interactive consistency property between the receivers (RCV1, RCV2, RCV3) of messages (MSGA, MSGB) each of the receivers (RCV1, RCV2, RCV3) is connected to the sender (SND) with at least two disjoint communication paths, wherein each of said disjoint communication paths comprises a switch (SWA, SWB; SWA1, SWB1) and communication links (110, 210; 111, 112, 113, 211, 212, 213), and wherein a first communication link of the communication links (111, 112, 113, 211, 212, 213) is configured to connect one of the receivers (RCV1, RCV2, RCV3) to the switch (SWA, SWB; SWA1, SWB1) of one of the at least two disjoint communication paths and a second communication link of the communication links (110, 210) is configured to connect the sender (SND) to the switch of said one disjoint communication path,
(a) wherein the switches (SWA, SWA1, SWB, SWB1) are equipped with local clocks, wherein local clocks of non-faulty switches of said switches (SWA, SWB, SWA1, SWB1) are synchronized to each other with a maximum error,
(b) wherein the receivers (RCV1, RCV2, RCV3) are configured to detect failures of switches (SWA, SWA1, SWA2, SWB, SWB1, SWB2),
(c) wherein the sender (SND) is configured to forward redundant copies (MSGA, MSGB) of a message of the messages to each of the receivers (RCV1, RCV2, RCV3), wherein each of the redundant copies (MSGA, MSGB) designated for the receiver (RCV1, RCV2, RCV3) is forwarded across different disjoint communication path connecting the sender (SND) with said receiver (RCV1, RCV2, RCV3),
(d) wherein the switch of each disjoint communication path from the sender (SND) to the receivers (RCV1, RCV2, RCV3) is configured such that the redundant copies (MSGA, MSGB) of the message are forwarded to each receiver (RCV1, RCV2, RCV3) with a temporal distance, CON, between the disjoint communication paths, wherein the temporal distance, CON, is selected such that all non-faulty receivers of the receivers (RCV1, RCV2, RCV3) will receive the redundant copies (MSGA, MSGB) in the same receive order when the switches and communication links of the disjoint paths do not exhibit a failure, and
(e) wherein each receiver (RCV1, RCV2, RCV3) is configured to conclude from the receive order of the redundant copies (MSGA, MSGB) of the message whether and which redundant copy (MSGA, MSGB) to accept to satisfy the interactive consistency property, wherein if a conclusion (RCV1, RCV2, RCV3) yields to accept a specific copy (MSGA, MSGB) of the received redundant copies of the message, the receiver is configured to accept said specific message, and wherein if a conclusion yields to not accept any copy of the receive redundant messages, the receiver is configured to not to accept any copy,
wherein the interactive consistency property comprises (i) all non-faulty receivers being configured to accept the messages from the sender, and (ii) if the sender is non-faulty, every non-faulty receiver being configured to accept the messages from the sender, and
wherein the temporal distance, CON, is a function of a precision of the communication network, wherein CON>FACTOR*precision, where FACTOR is a natural number greater than 0.

10. The computer system of claim 9, in which validity of the received redundant copies (MSGA, MSGB) of the message is taken into account for concluding whether and which redundant copy (MSGA, MSGB) to accept to satisfy the interactive consistency property.

11. The computer system of claim 10, in which:
(i) all non-faulty receivers (RCV1, RCV2, RCV3) which receive two or more redundant copies (MSGA, MSGB) of the message are configured to accept a first valid copy of the redundant copies (MSGA, MSGB) that they receive;
(ii) all non-faulty receivers (RCV1, RCV2, RCV3) which receive only one valid copy (MSGA, MSGB) of the redundant copies (MSGA, MSGB) of the message are configured to accept the one valid copy; and
(iii) all non-faulty receivers (RCV1, RCV2, RCV3) which do not receive any redundant copy (MSGA, MSGB) of the redundant copies of the message do not accept the message.

12. The computer system of claim 11, which is configured such that the receiver discards redundant copies of the two or more received redundant copies (MSGA, MSGB) of the message after receipt of the first valid copy.

13. The computer system of claim 9, in which:
(i) all non-faulty receivers (RCV1, RCV2, RCV3) which receive two or more redundant copies (MSGA, MSGB) of the message are configured to accept a last valid copy of the redundant copies (MSGA, MSGB) that they receive;
(ii) all non-faulty receivers (RCV1, RCV2, RCV3) which receive only one valid copy (MSGA, MSGB) of the redundant copies (MSGA, MSGB) of the message are configured to accept the one valid copy; and
(iii) all non-faulty receivers (RCV1, RCV2, RCV3) which do not receive any redundant copy (MSGA, MSGB) of the redundant copies of the message do not accept the message.

14. The computer system of claim 9, wherein the sender (SND) and all receivers (RCV1, RCV2, RCV3) are equipped with local clocks, wherein the local clocks of a non-faulty sender and non-faulty receivers are synchronized to the local clocks of the switches with a known precision, and wherein the sender (SND) sends the redundant copies (MSGA, MSGB) of the message according to a communication schedule and the receivers know when to expect the message according to said communication schedule.

15. The computer system of claim 14, wherein the local clocks of the switches, the local clocks of the sender (SND), and/or the local clocks of the receivers (RCV1, RCV2, RCV3) are synchronized by the IEEE 1588, the IEEE 802.1AS, and/or the SAE AS6802 protocol.

16. The computer system of claim 9, at least one of the communication links (110) are Ethernet links.

\* \* \* \* \*